Dec. 18, 1962 V. P. KOVACIK 3,069,527
VAPOR GENERATOR UTILIZING HEAT OF FUSION
Filed Sept. 8, 1959
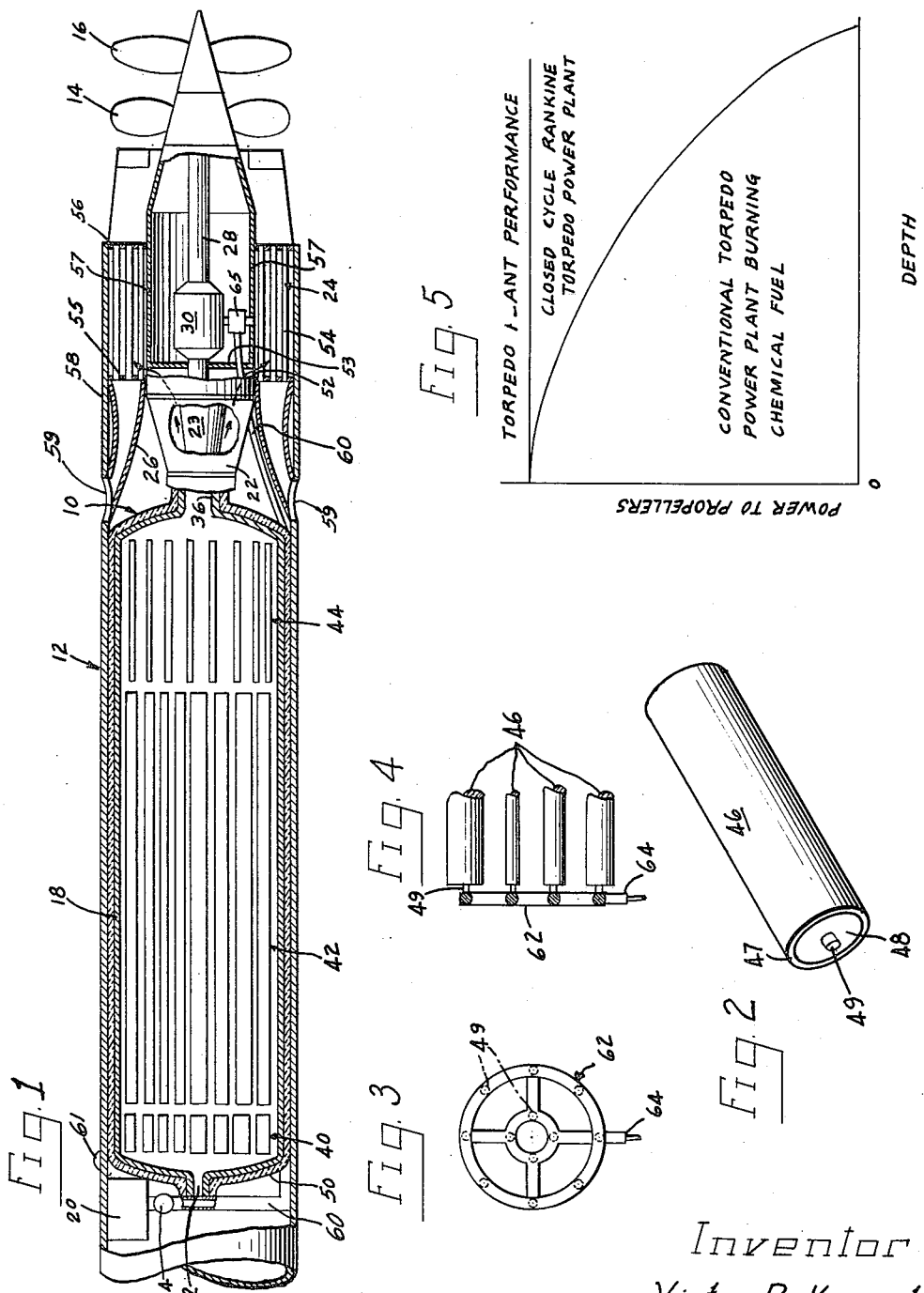
Inventor
Victor P. Kovacik
by Hill, Sherman, Meroni, Gross & Simpson Attys _United States Patent Office_

3,069,527
Patented Dec. 18, 1962

3,069,527
VAPOR GENERATOR UTILIZING HEAT OF FUSION
Victor P. Kovacik, Cleveland Heights, Ohio, assignor to Thompson Ramo Wooldridge Inc., Cleveland, Ohio, a corporation of Ohio
Filed Sept. 8, 1959, Ser. No. 838,627
3 Claims. (Cl. 219—38)

This invention relates to a power plant for torpedoes, and more particularly to a closed cycle Rankine engine powered by heat of fusion.

The release of gas from the combustion in conventional torpedoes creates an appreciable noise which can interfere with the operation of the homing sonar. Except for nuclear torpedo devices, however, the electric torpedo is the only type which does not expel products of combustion, and the weight required to meet performance specifications is excessive in such systems. A further problem with conventional torpedoes is that combustion efficiency changes with chamber pressure so that energy delivery is variable as a function of depth. Also, the controls required to compensate for power plant performance changes due to such depth variation are complex, and chemically fueled open cycle torpedoes are unsuitable for use below predetermined depths and beyond a predetermined range.

The present invention overcomes the difficulties mentioned with respect to conventional torpedoes and affords a propulsion system which is well suited for operations involving a wide range of operating depths, and where extremely low power plant and torpedo noise levels are required.

The power plant of the torpedo of the invention uses heat from a freezing material which has a high melting point as a source of energy for producing power to drive the torpedo turbine. Materials which can be utilized for this purpose include aluminum, sodium chloride and lithium hydride, and heat is stored by electrically placing the material in its molten condition, the heat being converted to shaft power as required by a closed cycle Rankine engine. Working fluids for the engine may include steam, mercury vapor and "Dowtherm," manufactured by the Dow Chemical Company. The boiler of the power plant includes an arrangement of cylinders containing the heat storage material, the specific construction of the cylinders being dependent in part upon the nature of the heat storage material used. Along the axis of each cylinder or heat storage unit is disposed an electrical heater, preferably in coaxial relationship therewith so as to keep thermal distortion to a minimum. Desirably, the boiler is formed in three sections each having a predetermined cylinder size and weight. The forward section of the boiler is comprised of relatively short cylinders, the second or intermediate section has cylinders of relatively long axial dimension and the third set of cylinders may have a dimension and construction intermediate in length between the first and second sets. The torpedo is provided with electrical heat plugs for receiving energy from the batteries of the submarine, and a connector ring structure may be utilized for connecting the electrical heaters of the respective sets to the electrical "umbilical cords" connected to the submarine batteries. Thus the forward section of the boiler is constructed to release heat when the working fluid is initially introduced into thereto at start-up, so as to take up the initial thermal shock. The second section of cylinders gives up heat so as to produce saturated steam, and the third section of the boiler superheats the steam thus produced. With regard to the third section, the cylinders are characterized by a high ratio of surface to weight, such as may be provided by a relatively small cross-sectional area for the individual cylinders. Where lithium hydride is the heat storage material, a cladding for the cylinders may be used such as niobium, although stainless steel 312 and 347 are also very suitable. The boiler is insulated from the torpedo hull by a material such as thermoflex, which requires very little thickness to insure exceptionally low heat losses.

The working fluid is stored in a pressurized tank prior to starting the power plant, from which it may be introduced into the boiler by suitable conduit and control means. After passing through the boiler, the fluid enters the turbine in the torpedo in the form of superheated steam and passes through a condenser from which it is returned, again by suitable conduit means, to the pressurized tank to complete the Rankine cycle. Generally, contra-rotating propellers will be required, and the reduction gears may be disposed in a gear box located in the area of the condenser subsequent to the turbine. Preferably, coolant for the condenser is obtained from the ocean water, a suitable shell being provided for this purpose having inlet means leading to condenser tubes surrounding a chamber containing the gear box and the gear shaft. The coolant water may then be discharged through the tail end of the turbine. However, where a direct drive is used, a low speed turbine is desirable and in this embodiment, a mercury turbine is effective because of its relatively low rotational speed. In the gear reduction form of the torpedo, steam or Dowtherm are preferred.

Accordingly, it is an object of the present invention to provide a torpedo which is capable of operating at a substantial depth.

Another object of the invention is to provide a closed-cycle engine utilizing heat storing materials having high heat of fusion.

Another object of the invention is to provide a torpedo as described wherein the performance of the power plant and of the torpedo are independent of the depth of operation.

Another object of the invention is to provide a device having a very low noise level, partly as a result of the fact that no combustion products are returned to the water, and affording unusually simple controls.

Another object of the invention is to provide a torpedo as described which may be stored safely at room temperature as a result of the absence of explosive materials therein.

Another object of the invention is to provide a torpedo as described in which the sonar system may be especially effective as a result of the aforementioned low noise levels.

Another object of the invention is to provide a torpedo as described which may be maintained at constant, readiness, or in a "hot" condition, with but little energy.

Another object of the instant invention is to utilize a power plant based on the Rankine cycle for driving a torpedo with a high degree of efficiency.

Other objects and advantages of the invention will become apparent as the description proceeds in accordance with the drawings, in which:

FIGURE 1 is a vertical sectional view of a torpedo power plant according to the present invention;

FIGURE 2 is a perspective view of a heat storage cylinder for use in the power plant of the invention;

FIGURE 3 is a front view of a connector ring used in the boiler of the invention;

FIGURE 4 is a fragmentary side elevational view of a plurality of heat storage units such as shown in FIGURE 2 in association with the electrical connector ring of FIGURE 3; and FIGURE 5 is a graphical representation of the torpedo power plant performance of the plant of the present invention in comparison with a conventional torpedo power plant which burns chemical fuel and exhausts to the ocean.

Referring now to the drawings, a power plant according to the invention is designated generally by reference numeral 10 and may be used in conjunction with a torpedo 12 having a warhead, a guidance system and a sonar system (not shown) in accordance with the understandings of those skilled in the art, and counter-rotating propellers 14 and 16. The power plant 10 operates as a closed cycle Rankine engine used with heat storage means, and in its application to a torpedo it affords considerably better overall performance characteristics than have been available previously. The engine 10 includes a boiler pressure vessel 18, a pressurized tank 20 for storing working fluid prior to the energization of the power plant, a turbine 22 having a turbine wheel 23 driven by energy imparted to the working fluid by the boiler pressure vessel 18 and a condenser 24 cooled by ocean water introduced thereto through an annular shell structure 26, as hereinafter described. The turbine wheel 23 drives a shaft 28 and in the form of the invention shown, wherein counter-rotating propellers are utilized, a gear box 30 is generally required to reduce the speed of operation of the propellers. However, a further reduction in noise level may be afforded by the elimination of the gear reduction means, as is possible where a mercury turbine system is used in conjunction with a direct acting propeller.

The pressurized tank 20 communicates with boiler pressure vessel 18 by means of a suitable conduit 32 which may be controlled by a valve 34 operated by suitable control means (not shown). The conduit 32 may enter the pressure vessel 18 coaxially at the inner end thereof, and the pressure vessel defines an outlet conduit 36 for introducing the energized working fluid to the turbine 22.

Steam, mercury vapor or Dowtherm may be employed as a working fluid in the power plant 10, and means are provided in the pressure vessel 18 thereof for heating the working fluid introduced through the conduit 32 according to a predetermined sequence of steps.

The invention will be herein described with respect to the use of water as a working fluid and lithium hydride as the heat storage material. However, other heat storage materials may be utilized within the scope of the invention, which have a high melting point and which impart heat to the working fluid as they freeze, such materials including aluminum and sodium chloride. Lithium hydride has a heat of fusion of about 1500 B.t.u. per lb., and in order to position the heat storage material in heat exchange relationship with the working fluid, a plurality of sets of heat storage units are provided which are shown schematically and designated generally by reference numerals 40, 42 and 44, respectively. Each of the sets 40, 42 and 44 is comprised of a plurality of heat storage units such as is shown in FIGURE 3 and designated by reference numeral 46. The units 46 desirably have the form of a cylindrical rod or cartridge of predetermined length, as hereinafter described, and have a predetermined cross-sectional dimension. The cartridges are provided with a cladding 47 such as to reduce corrosion to a minimum. This feature is important since the length of time that it is feasible to keep the torpedo in condition for launching, or "hot," will depend upon the corrosion rate of the material containing the heat storage material. Where lithium hydride is used as the heat storage material, as indicated at 48, a cladding material such as niobium is suitable, although stainless steels No. 312 and No. 347 are also effective.

The heat storage units 46 in the set 40 are relatively short and are configured and dimensioned to release their heat when the working fluid is initially introduced into the boiler at startup so as to take up the thermal shock. The second section of cylinders, designated by reference numeral 42, is relatively elongated and is effective to give up heat to produce saturated steam from the working fluid passing from the set 40. The third set or section of cylinders 44 is characterized by a high ratio of surface to weight, and desirably has a length intermediate the length of the sections 40 and 42 with its cylinders being of relatively small cross-sectional area as shown. The cylinders in the section 44 superheat the steam produced by the cylinders in the section 42 so that it may be passed through the conduit 36 to drive the turbine 22.

In order to store heat in the storage units 46, an electrical heater element 49 is disposed coaxially in each of the units, preferably having a capacity for dissipating in the neighborhood of 300 kilowatts. Thus the individual units 46 and the torpedo can be charged with energy in approximately one hour, for example, so that the heat storage material is placed in the molten condition and thereafter maintained in such condition until its energy is needed. It will be understood, however, that variations in the capacity of the heater elements 49 are encompassed within the scope of the invention, and if it is desired to charge the torpedo in less time, the capacity will be inversely proportional to the time required. The heater elements 49 may be supplied by the submarine generator system through "umbilical cords" hooked to the torpedo at a suitable plug 61 in electrical communication with connector means such as indicated at 62, which may be of generally annular construction for connecting the heater units in the respective sections 40, 42 and 44 with an electrical conduit 64 connected to the plug 61. In the particular form herein shown and as hereinafter further described, only about 6 kilowatts are required to make up thermal losses after the torpedo has been fully energized, and although this requirement also will vary with particular variations in construction, it will be understood that the amount of power required to maintain the "hot" condition of the torpedo is relatively very small.

To this end, the boiler is insulated from the torpedo hull by a material such as thermoflex as indicated at 50 having a thickness preferably in the neighborhood of one quarter of an inch to maintain the described very low heat losses. After leaving the turbine wheel 23, the fluid is passed to the condenser 24 through suitable openings 52, as directed by a baffle 53, the condenser being preferably a tube and shell construction wherein tubes 54 are positioned in end walls 55 and 56 around an inner wall 57 to receive coolant from the conduit means 26. The coolant for the fluid desirably is the ocean water surrounding the torpedo 12, and to this end the rear portion 58 of the hull of the torpedo defines openings 59 leading to the conduit 26, although other cooling fluids may be employed within the scope of the invention. The ocean water is exhausted at the rear of condenser 24 as shown, and the condensate is returned to the boiler vessel 18 through conduit means 60. Pump means 65 may be provided for this purpose which may be driven by the turbine wheel 23, via the gear means 30, or otherwise.

As an illustration of the characteristics of a power plant according to the invention, where water is used as the working fluid and power is to be delivered to the water at 260 H.P., the boiling temperature achieved as described would be in the neighborhood of 600° F. with the boiling pressure being 1500 p.s.i.a, and the turbine inlet temperature at the inlet 36 would be in the neighborhood of 900° F. with the turbine exit temperature at 120° F. The energy thus utilized in the turbine would yield 342 H.P. with a turbine of efficiency 85%, propeller efficiencies of 80% and auxiliary power 5% of the power delivered to the water. A total heat stored in the neighborhood of about 1,065,000 B.t.u. with 710 lbs. (14 cubic feet) of lithium hydride (at 1500 B.t.u., 1 lb.), is available as produced by 200 lbs. of electric heater rods. Thermal losses would be approximately 2% of heat stored. In an embodiment of the invention wherein the torpedo diameter is approximately 21 inches, the total weight of the energy storage system plus the power plant is, for example, 1,350 lb.

In operation, a submarine entering an area for attack is prepared by placing a torpedo 12 in the conventional torpedo tube hooking the "umbilical cord" to the torpedo and energizing the torpedo power plant as described. The torpedo may be kept in the "hot" condition for days at a time if required with the working fluid stored in the pressurized tank 20. Immediately upon launching, the working fluid is introduced into the boiler 18 by suitable valve means such as valve 34, which is turned on only at start-up, whereupon the power driving the propellers 14 and 16 is generated.

The heat of fusion energy system utilized in the invention may be compared with a battery operated system on the basis that lithium hydride is in the neighborhood of 11 times more efficient than battery means in providing the same performance levels. Thus a battery operated system meeting the performance requirements mentioned would weight about 8000 lbs. and afford 50 watt hours per lb. This weight is not feasible with torpedoes of the type described. Since the plant of the invention is a Rankine cycle system, there is no combustion and therefore no change in combustion efficiency with chamber pressure variations. Thus the delivery of energy is independent of depth. Further, the closed Rankine cycle also affords a turbine back pressure and general turbine performance which is independent of depth.

As a result of this freedom from variation in the operating characteristics of the power plant with variation in depth, much simpler controls are possible than have been possible with conventional systems, and better performance is provided than with chemically fueled open cycle torpedoes, as may be seen from an examination of FIGURE 5.

It has been found that a significant proportion of the total noise of a torpedo at depth comes from power plant vibration, and the elimination of most of this noise affords better sonar operation than has been achieved previously. In part, this reduction in noise results from the fact that the working fluid does not escape to mix with the ocean water, and the power plant also permits the use of a carefully calibrated design for the rotating machinery such as to eliminate undesirable harmonics.

A previously indicated, no explosion hazard exists when the torpedo is stored at normal temperatures, since the torpedo does not contain combustible materials such as solid rocket fuels and alcohols. Thus it is essentially inert at room temperatures. The power plant is also reuseable without the need for the addition of chemical fuel, since it is only necessary to plug the torpedo into an electrical power supply to charge it again, so the torpedo can be used over and over in test operations. And for advanced homing torpedo applications the reduced noise level and the power plant performance independent of depth afforded by the invention are extremely important and advantageous.

Although I have herein set forth and described my invention with respect to certain specific principles and details thereof, it will be understood by those skilled in the art that these may be varied without departing from the spirit and scope of the invention set forth in the hereunto appended claims.

I claim as my invention:

1. In a vapor generator, means for flowing a vaporizable material in a confined flow path, means in the confined flow path for vaporizing the material including a plurality of cartridges containing a material having a high heat of fusion and means for selectively heating the material in the cartridges to melt the material whereby upon termination of the heating, fusion of the material in the cartridges will release heat of fusion to vaporize the vaporizable material, said cartridges including a first set of relatively short cartridges for initial contact with the vaporizable material, a second set of relatively elongated cartridges to afford full vaporization of the material, and a third set of cartridges having a high ratio of surface to weight to superheat the vapor from said second set of cartridges.

2. In a power system including means for flowing a vaporizable material in a closed circuit,
   means in the circuit for vaporizing the material,
      including a plurality of cartridges containing a material having a high heat of fusion,
   means for selectively heating the material in the cartridges
      whereby upon termination of the heating, fusion of the material in the cartridges will release heat to vaporize the vaporizable material,
      said heating means comprising an internal electrical heating element in each cartridge and coaxial therewith to minimize thermal distortion,
      said cartridges including a first set of relatively short cartridges for initial contact with the vaporizable material,
         a second set of relatively elongated cartridges to afford full vaporization of the material,
         and a third set of cartridges having a high ratio of surface to weight to superheat the vapor from said second of set cartridges.

3. In a power system including means for flowing a vaporizable material in a closed circuit,
   means in the circuit for vaporizing the material,
      including a plurality of cartridges containing a material having a high heat of fusion,
   means for selectively heating the material in the cartridges
      whereby upon termination of the heating, fusion of the material in the cartridges will release heat to vaporize the vaporizable material,
      said heating means comprising an internal electrical heating element in each cartridge and coaxial therewith to minimize thermal distortion,
      said cartridges including a first set of cartridges for initial contact with the vaporizable material,
         a second set of cartridges to afford full vaporization of the material,
         and a third set of cartridges having a high ratio of surface to weight to superheat the vapor from said second set of cartridges.

References Cited in the file of this patent

UNITED STATES PATENTS

| | | |
|---|---|---|
| 265,523 | Kellogg | Oct. 3, 1882 |
| 625,892 | Maurice | May 30, 1899 |
| 1,069,949 | Hassler | Aug. 12, 1913 |
| 1,313,676 | Du Pont | Aug. 19, 1919 |
| 1,475,589 | Marden | Nov. 27, 1923 |
| 1,741,657 | Rowan | Dec. 31, 1929 |
| 1,790,555 | Plumb | Jan. 27, 1931 |
| 1,804,694 | Jones | May 12, 1931 |
| 1,862,065 | Rowe | June 7, 1932 |
| 1,877,762 | Griswold | Sept. 20, 1932 |
| 1,890,429 | Griswold | Dec. 6, 1932 |
| 2,066,127 | Slayter | Dec. 29, 1936 |
| 2,229,554 | Cummings | Jan. 21, 1941 |
| 2,368,755 | Falardeau | Feb. 6, 1945 |
| 2,379,183 | Price | June 26, 1945 |
| 2,522,373 | Jodell | Sept. 12, 1950 |
| 2,596,968 | Harris et al. | May 20, 1952 |
| 2,791,204 | Andrus | May 7, 1957 |
| 2,911,513 | MacCracken | Nov. 3, 1959 |
| 2,936,741 | Telkes | May 17, 1960 |